(12) United States Patent
Parshad et al.

(10) Patent No.: US 7,735,939 B2
(45) Date of Patent: Jun. 15, 2010

(54) STACKED CABINET STRUCTURE WITH INTERMEDIATE RACEWAY

(75) Inventors: David Parshad, Markham (CA); Peter Woronecki, Holland Landing (CA); Ivan Liu, Markham (CA)

(73) Assignee: Inscape Corporation, Holland Landing, Ontario (CA)

( * ) Notice: Subject to any disclaimer, the term of this patent is extended or adjusted under 35 U.S.C. 154(b) by 780 days.

(21) Appl. No.: 11/524,307

(22) Filed: Sep. 21, 2006

(65) Prior Publication Data

US 2008/0074015 A1    Mar. 27, 2008

(30) Foreign Application Priority Data

Aug. 15, 2006 (CA) .................................. 2556124

(51) Int. Cl.
*A47B 87/00* (2006.01)
(52) U.S. Cl. ..................... 312/108; 312/198; 312/223.6
(58) Field of Classification Search ................. 312/198, 312/107, 108, 111, 223.1, 308; 108/108, 108/50.01, 50.02, 57.33, 147.16, 150; 52/220.1–220.08, 52/696; 174/50, 58, 63; 248/65; 361/742, 361/752, 758, 330, 829
See application file for complete search history.

(56) References Cited

U.S. PATENT DOCUMENTS

| | | | |
|---|---|---|---|
| 2,489,494 A | | 11/1949 | Martin |
| 2,921,826 A | * | 1/1960 | McLennon .................... 312/45 |
| 3,855,427 A | * | 12/1974 | Sinden ........................ 361/827 |
| 4,274,547 A | | 6/1981 | Takagi et al. |
| 4,278,834 A | * | 7/1981 | Boundy ....................... 174/497 |
| 4,660,901 A | | 4/1987 | Shimada |
| 4,691,644 A | | 9/1987 | Frydman |
| 4,821,535 A | * | 4/1989 | Wassilak et al. ............... 68/3 R |
| 4,986,616 A | * | 1/1991 | Chang et al. ................. 312/323 |
| 5,209,035 A | | 5/1993 | Hodges et al. |
| 5,394,658 A | | 3/1995 | Schreiner et al. |
| 5,406,760 A | | 4/1995 | Edwards |
| 5,645,329 A | * | 7/1997 | Madock ..................... 312/9.63 |
| 5,809,708 A | | 9/1998 | Greer et al. |
| 5,913,787 A | | 6/1999 | Edwards |
| 5,921,795 A | * | 7/1999 | Weener et al. ............... 439/215 |
| 5,938,302 A | * | 8/1999 | Anderson et al. ......... 312/223.1 |
| 5,994,644 A | * | 11/1999 | Rindoks et al. ............. 174/495 |

(Continued)

OTHER PUBLICATIONS

Allsteel "Reach" Brochure Form A7509 (Dec. 2004)—34 pages.

*Primary Examiner*—Darnell M Jayne
*Assistant Examiner*—Andres Gallego
(74) *Attorney, Agent, or Firm*—Riches, McKenzie & Herbert LLP

(57) ABSTRACT

A stacked cabinet structure for vertical stacking of a lower cabinet with a top wall and an upper cabinet with a bottom wall in which a spacer member is provided intermediate the top wall of the lower cabinet and the bottom wall of the upper cabinet with the spacer member supported by the top wall of the lower cabinet and supporting the bottom wall of the upper cabinet forming a horizontally extending raceway vertically between the top wall of the lower cabinet and the bottom wall of the upper cabinet for passage of utility wiring. The raceway preferably is open at least at a front access opening preferably with uninterrupted access provided to the raceway inwardly from the front access opening through the entire width of each cabinet from a first side to a second side.

23 Claims, 16 Drawing Sheets

U.S. PATENT DOCUMENTS

| | | |
|---|---|---|
| 6,135,583 A | 10/2000 | Simon et al. |
| 6,158,180 A | 12/2000 | Edwards |
| 6,193,341 B1 * | 2/2001 | Eizadkhah et al. .......... 312/323 |
| 6,315,249 B1 * | 11/2001 | Jensen et al. ................... 248/65 |
| 6,394,398 B1 * | 5/2002 | Reed et al. .................... 248/57 |
| 6,788,535 B2 * | 9/2004 | Dodgen et al. .............. 361/695 |
| 6,955,410 B1 * | 10/2005 | Nelson et al. ................ 312/352 |
| 6,999,305 B1 * | 2/2006 | Calcote ....................... 361/601 |
| 7,278,360 B2 * | 10/2007 | Griepentrog ............. 108/50.02 |
| 7,310,234 B2 * | 12/2007 | Miller et al. ................. 361/752 |
| 2002/0140325 A1 * | 10/2002 | Webster et al. ........... 312/223.1 |
| 2005/0162051 A1 | 7/2005 | Madsen et al. |

\* cited by examiner

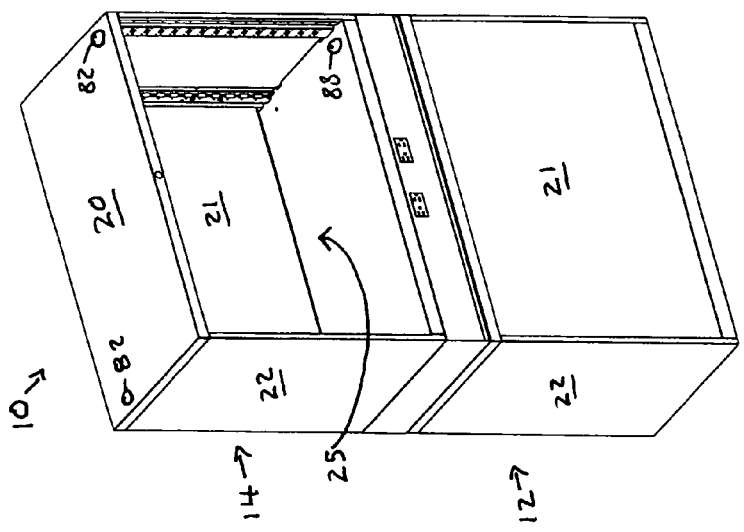
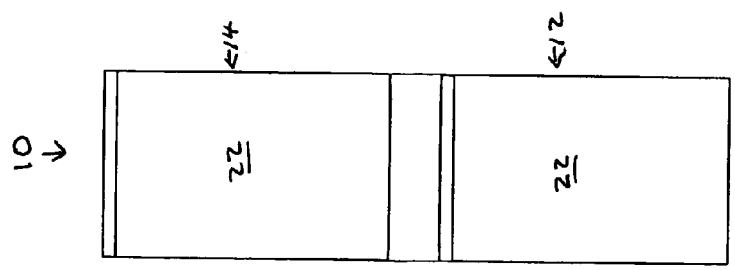
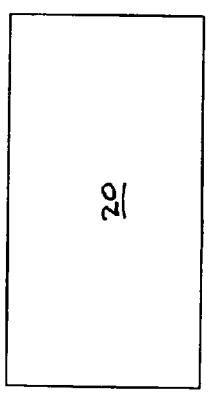
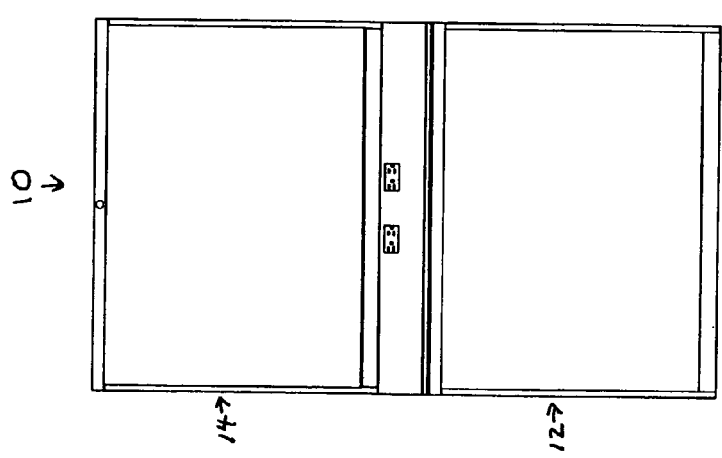

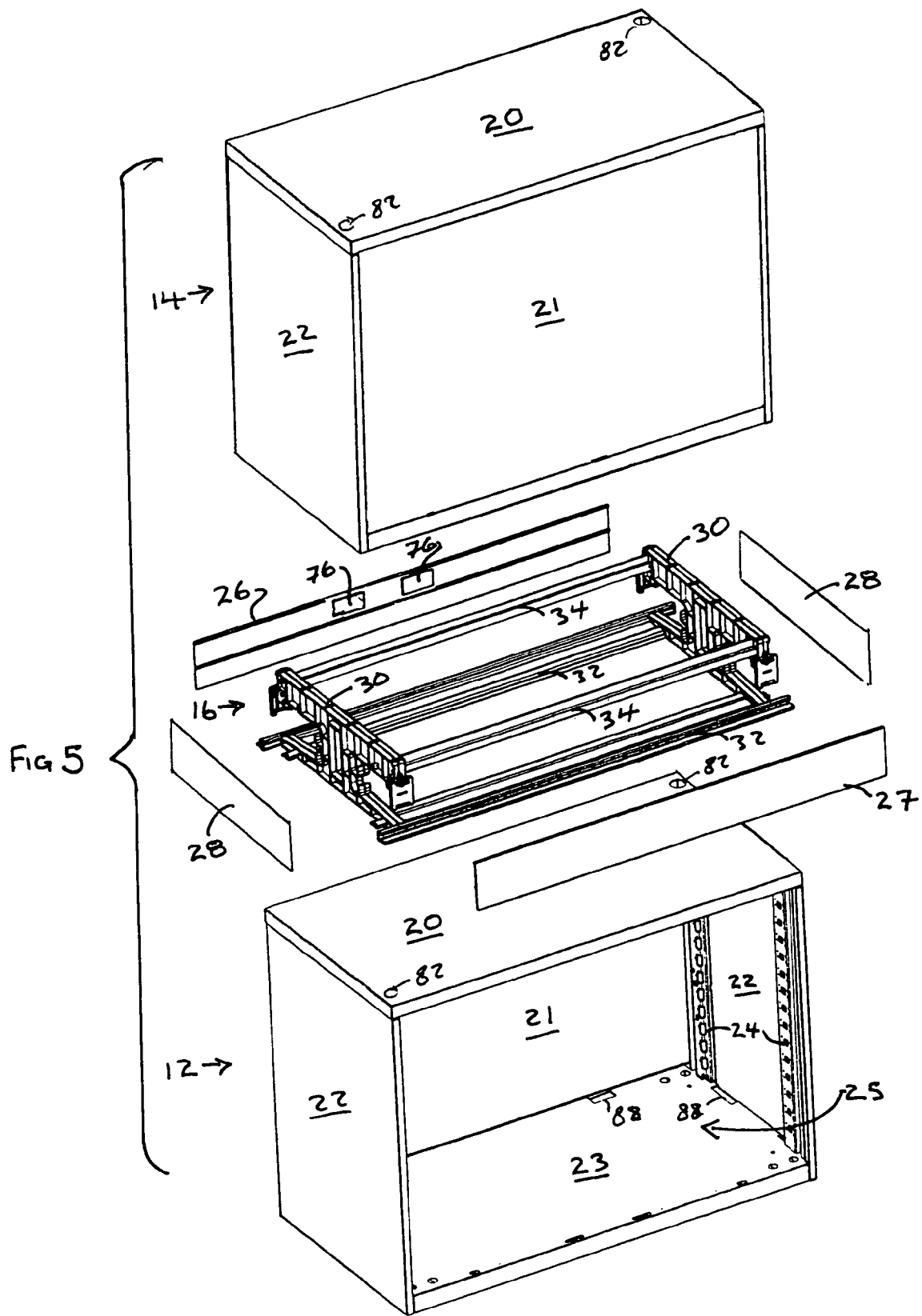

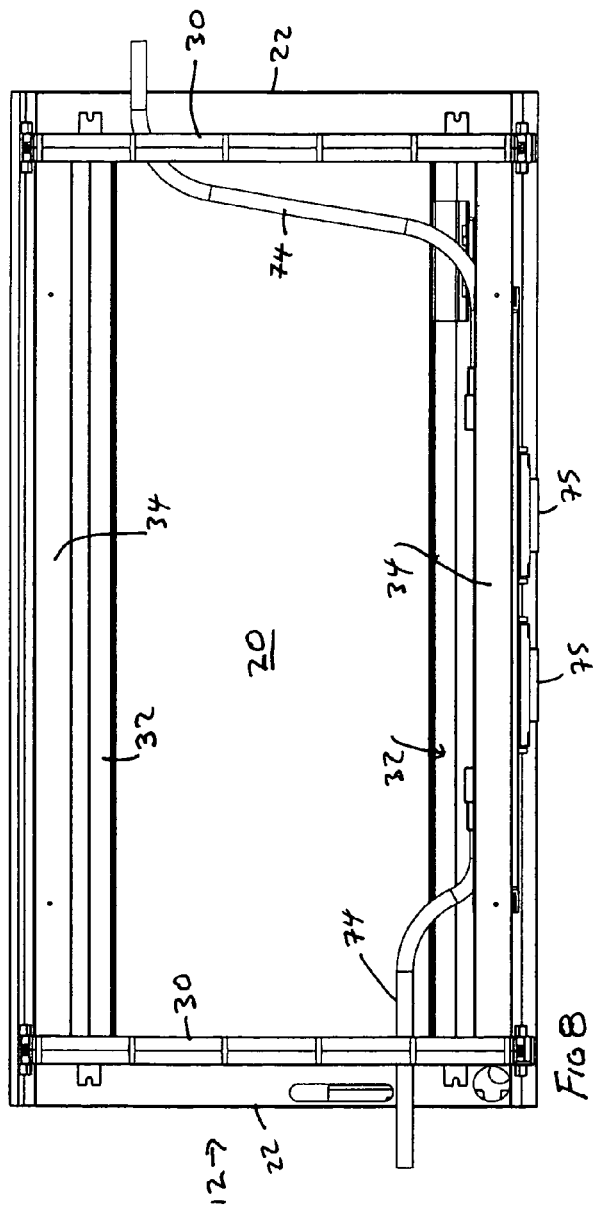
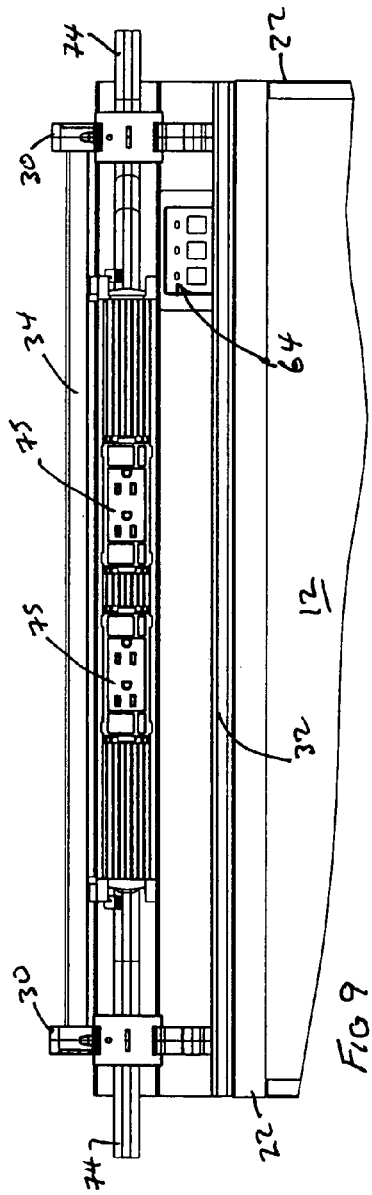

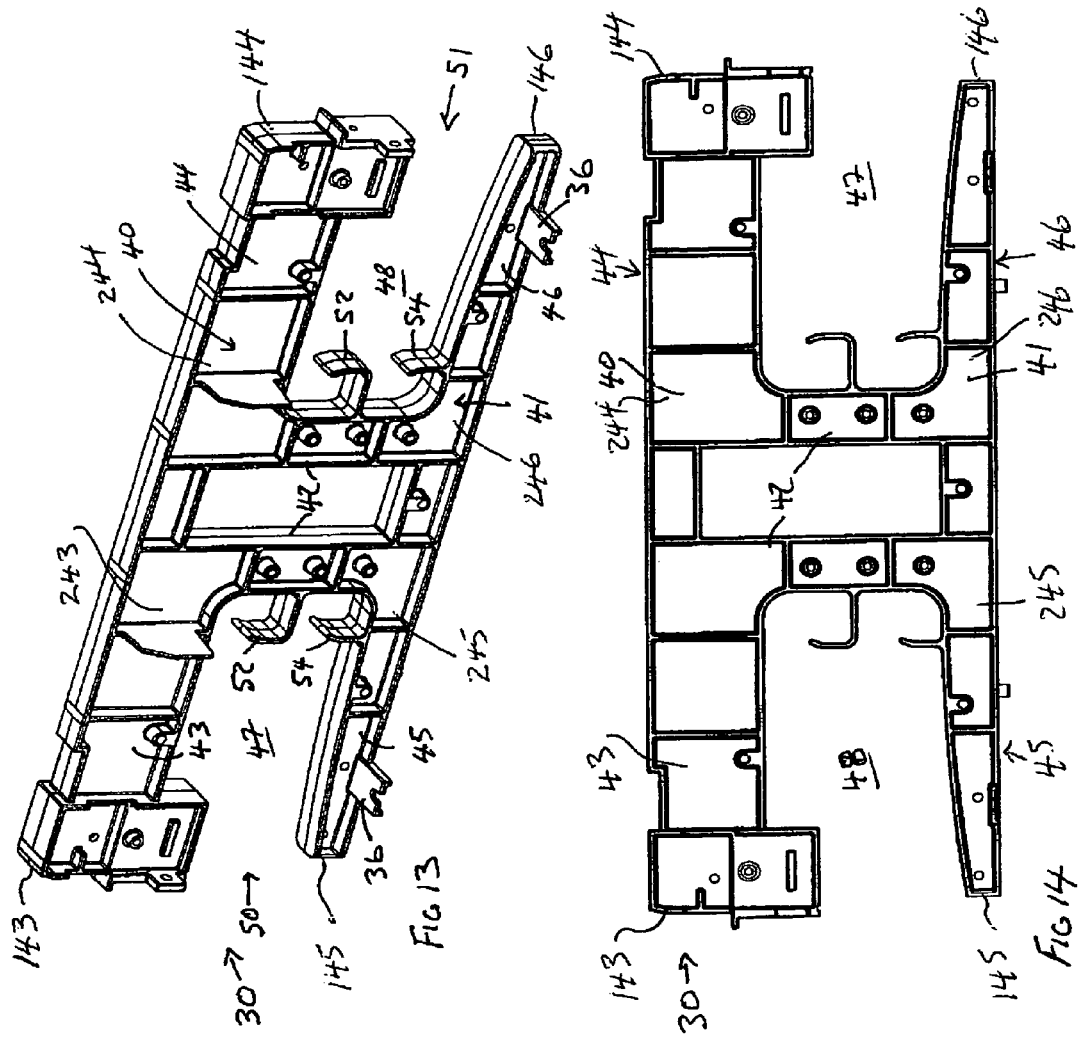

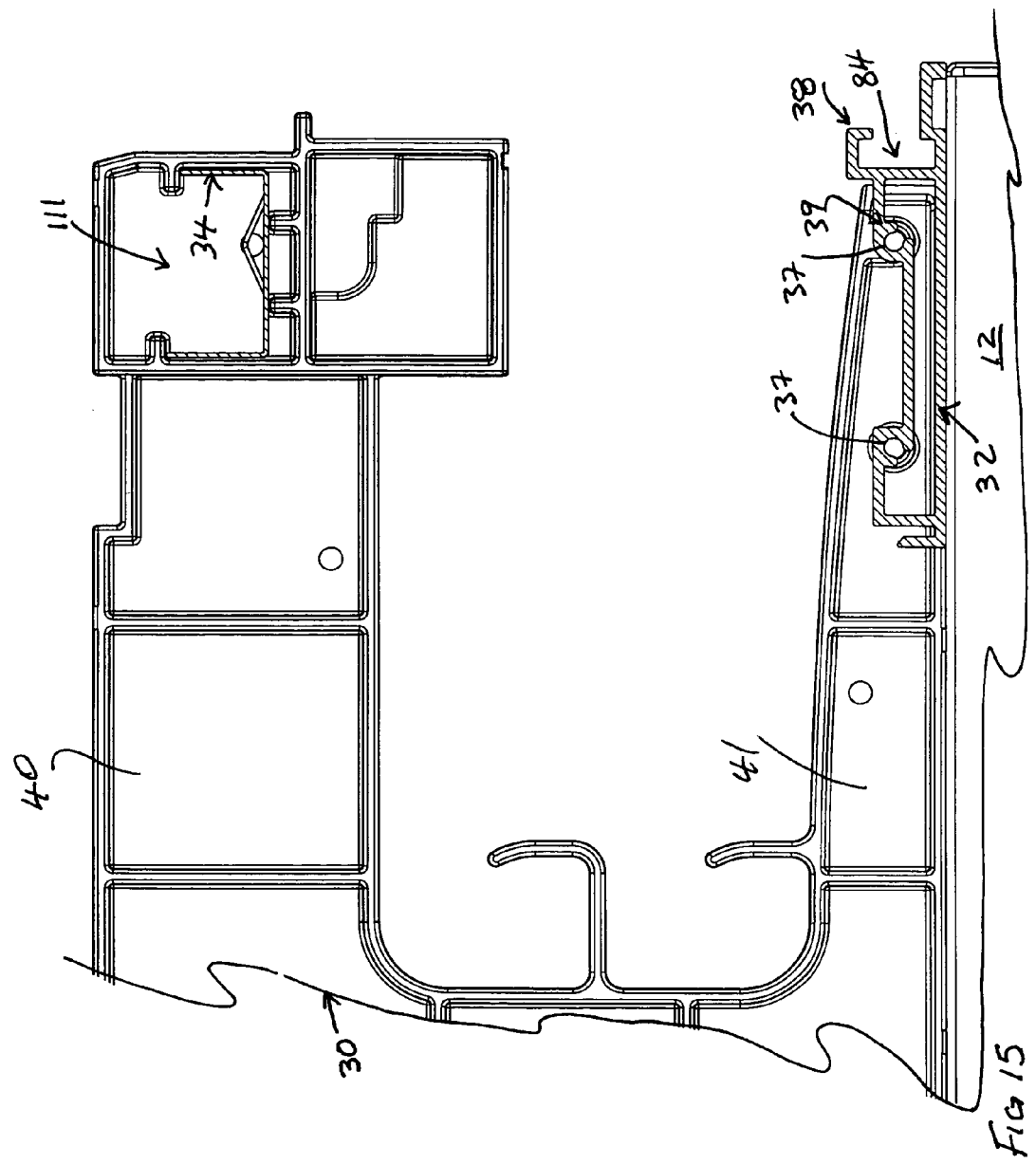

_US 7,735,939 B2_

STACKED CABINET STRUCTURE WITH INTERMEDIATE RACEWAY

SCOPE OF THE INVENTION

This invention relates to office cabinets and, more particularly, to a stacked cabinet structure providing a raceway intermediate two stacked cabinets for passage of utility wiring.

BACKGROUND OF THE INVENTION

Modular office furniture is known including modular partitions such as disclosed in U.S. Pat. No. 5,406,760 to Edwards in which raceways are provided through the partition for passage of utility wiring. Such raceways are well known in various partitions to which tabletops and shelving and cabinets may be secured. The present inventor has appreciated that difficulties arise in respect of providing raceways for passage of utility wiring through filing cabinets.

Modular office partitions are known in which desking surfaces are supported on modular partitions with utility wiring for use on such desk surfaces to be provided by raceways in the partitions. The present inventor has appreciated that cabinet structures are not used as support platforms for desking arrangements and particularly arrangements in which utilities are conveniently provided to desking surfaces.

SUMMARY OF THE INVENTION

To at least partially overcome these disadvantages of previously known devices, the present invention provides a stacked cabinet structure in which an upper cabinet is stacked on a lower cabinet supported and spaced therefrom by a spacer member providing a horizontally extending raceway for passage of utility wiring.

An object of the present invention is to provide a structure for providing a raceway between stacked cabinets such as filing cabinets and cabinets containing shelving as are conventionally found in an office environment.

Another object is to provide a construction for a spacing member adapted to be received on top of a lower cabinet and to support an upper cabinet thereabove.

Another object is to provide a spacer member to space an upper cabinet stacked above a lower cabinet and provide for laying in of wiring and/or coupling of wiring to the spacer member.

Another object is to provide a simplified arrangement for stacking office cabinet structures one on top of the other without the need to modify the standard construction of the cabinet structure.

Another object is to provide an arrangement for supporting work surfaces on an office cabinet.

The present invention provides a stacked cabinet structure for vertical stacking of a lower cabinet with a top wall and an upper cabinet with a bottom wall. A spacer member is provided intermediate the top wall of the lower cabinet and the bottom wall of the upper cabinet with the spacer member supported by the top wall of the lower cabinet and supporting the bottom wall of the upper cabinet forming a horizontally extending raceway vertically between the top wall of the lower cabinet and the bottom wall of the upper cabinet for passage of utility wiring. The raceway preferably is open at least at a front access opening preferably with uninterrupted access provided to the raceway inwardly from the front access opening through the entire width of each cabinet from a first side to a second side. Preferably, a spacing compartment is formed between the top wall of the lower cabinet and the bottom wall of the upper cabinet with a front raceway passing through the cabinet adjacent a front access opening and, preferably, a rear raceway passing through the compartment adjacent a rear access opening. Preferably, the compartment is open at its front, rear and each of its two sides and each of the front and rear raceways is open along its respective front or rear and at each side.

The spacer member preferably comprises a structure with at least two truss members spaced laterally from each other disposed in a vertical plane extending front to rear and between the top wall and the bottom wall. Preferably, a plurality of horizontally extending beam members span horizontally between the truss members spaced from adjacent beam members. The beam members preferably are fixedly connected to the truss members to form the spacer member as a rigid assembly.

Cover panels to substantially close the front access opening and any rear access opening or side access openings are preferably coupled to the spacer member. In addition, utility wiring including electrical wiring and associated electrical outlets are mounted to the spacer member and, as well, communication wiring including connection ports for the communication wiring is mounted to the spacer member.

In one aspect, the present invention provides a stacked cabinet structure having:
 a lower cabinet with a top wall,
 an upper cabinet with a bottom wall, and
 a spacer member intermediate the top wall of the lower cabinet and the bottom wall of the upper cabinet,
 the spacer member supported by the top wall of the lower cabinet and supporting the bottom wall of the upper cabinet spaced vertically from the top wall forming a horizontally extending raceway vertically between the top wall and the bottom wall for passage of utility wiring,
 the raceway open at a front access opening.

In another aspect, the present invention provides a stacked cabinet structure having:
 a lower cabinet with a top, a bottom, a front, a back and two sides,
 an upper cabinet with a top, a bottom, a front, a back and two sides, and
 a spacer member intermediate the top of the lower cabinet and the bottom of the upper cabinet,
 the upper cabinet stacked vertically above the bottom cabinet with the two sides of the upper cabinet in vertical alignment with the respective two sides of the lower cabinet, the front of the upper cabinet in vertical alignment with one of the front and back of the lower cabinet, and the back of the upper cabinet in vertical alignment with the other of the front and back of the lower cabinet,
 the spacer member supported by the top of the lower cabinet and supporting the bottom of the upper cabinet spaced vertically from the top of the lower cabinet forming a spacing compartment between the top of the lower cabinet and the bottom of the upper cabinet for passage of utility wiring,
 the compartment open at a front access opening,
 a cover panel coupled to the spacer member to at least partially close the front access opening and movable to provide access to the raceway through the front access opening.

BRIEF DESCRIPTION OF THE DRAWINGS

Further aspects and advantages of the present invention will become apparent from the following description taken together with the accompanying drawings in which:

FIG. 1 is a perspective view of a stacked cabinet in accordance with the preferred embodiments;

FIGS. 2, 3 and 4 are, respectively, top, front and left side views of the cabinet of FIG. 1;

FIG. 5 is an exploded schematic rear view of the stacked cabinet of FIG. 2;

FIG. 8 is a top view of FIG. 6;

FIG. 9 is a front view of FIG. 6;

FIG. 13 is a perspective outer side view of a spacer similar to that in FIG. 5;

FIG. 14 is an inner side view of the inner side of the spacer of FIG. 13;

FIG. 15 is an enlarged side view of a portion of the inner side of the spacer of FIG. 13 showing an upper beam and a lower beam in cross-section and the top of the lower cabinet;

DETAILED DESCRIPTION OF THE DRAWINGS

Figure 6:
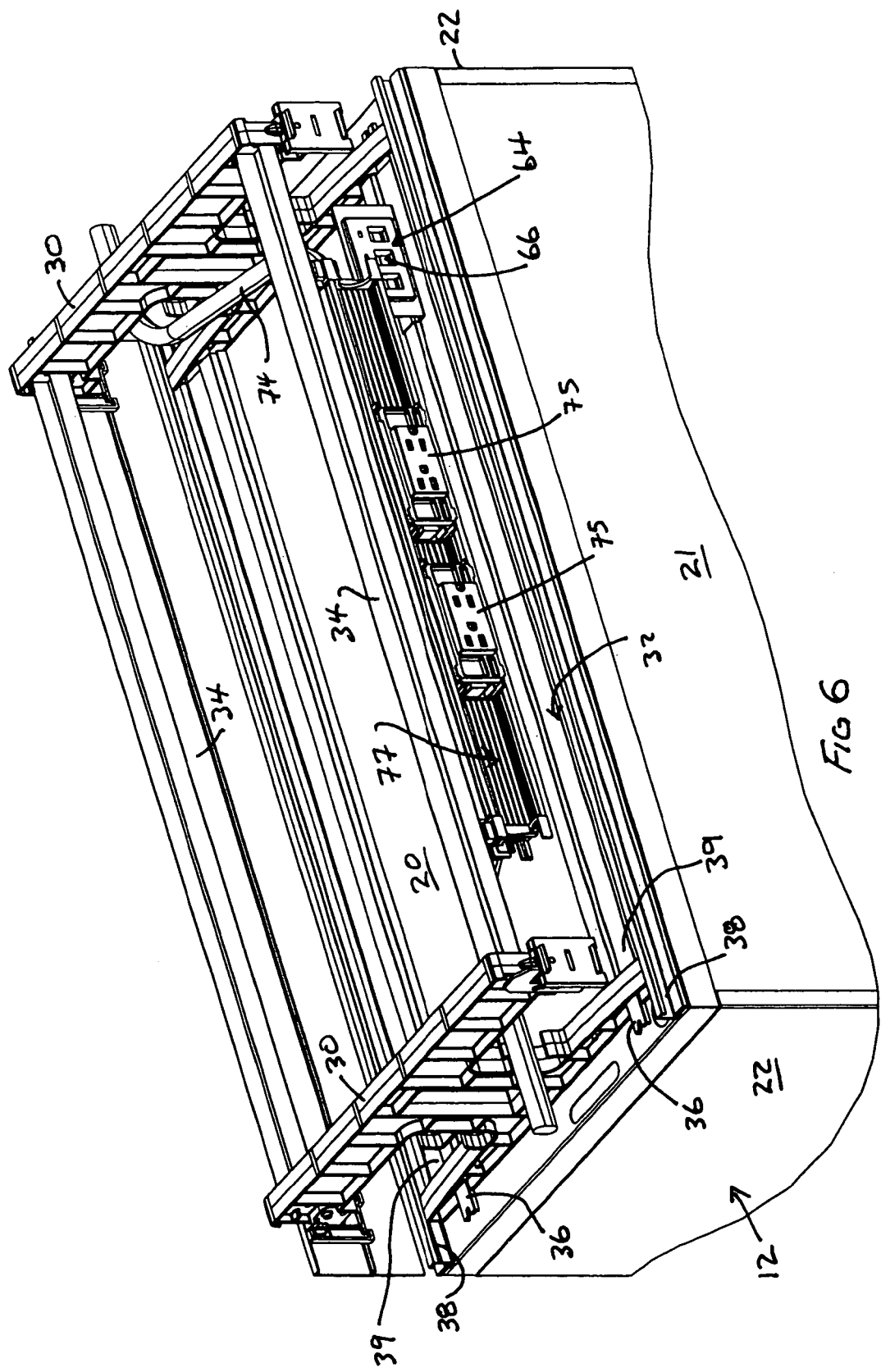
FIG. 6 is a partially cut away perspective front view showing the lower cabinet and the spacer shown in FIG. 5 secured on top of the lower cabinet and also including a rear cover, an electrical wiring connector and a communications connector.
Figure 7:
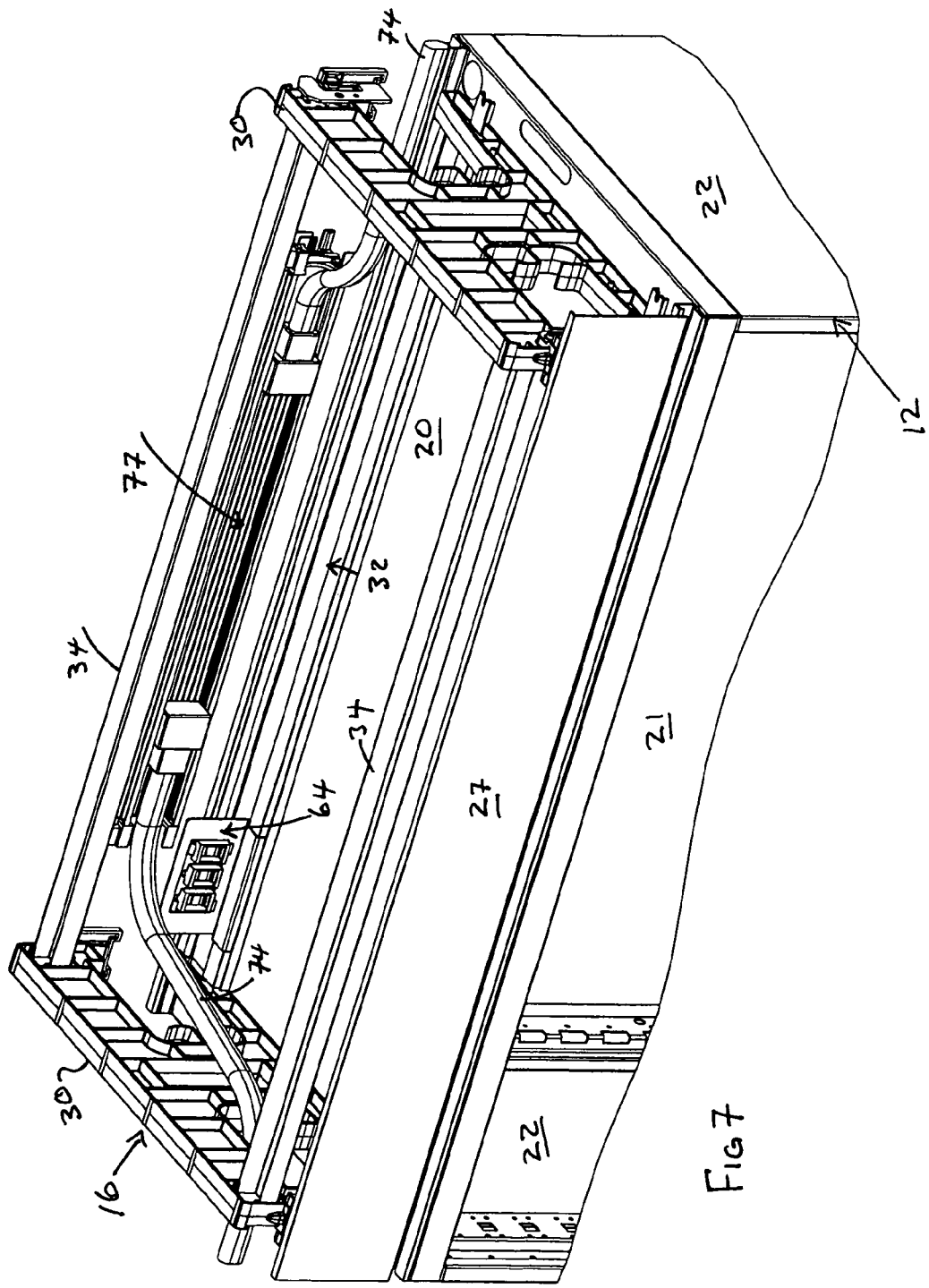
FIG. 7 is a perspective rear view of FIG. 6.

Reference is made first to FIGS. 1 to 5 which show an assembled stacked cabinet 10 in accordance with a preferred embodiment of the invention. FIG. 5 schematically illustrates in an exploded rear view of FIG. 1, the major components of the stacked cabinet 10 comprising a lower cabinet 12 and an upper cabinet 14 with a spacer member 16 in between the lower cabinet 12 and the upper cabinet 14 to space the upper cabinet 14 vertically above the lower cabinet 12 providing a spacing compartment 18 as best seen in side view in FIG. 10 between the lower cabinet 12 and the upper cabinet 14. In FIGS. 1 to 5, each of the lower cabinet 12 and the upper cabinet 14 are identical. Each preferably is formed from sheet metal and has a closed top 20, a closed back 21, two closed sides 22 and a closed bottom 23. The lower cabinet is shown in FIG. 5 as having two sides 22, one of which may be considered a first side 22 and the other of which may be considered a second side 22, for example the side 22 on the left hand side may be considered on a first side 22 and the side 22 on the right hand side of the drawing may be considered a second side 22. The upper cabinet is also shown in FIG. 5 as having two sides 22, one of which may be considered a first side 22 and the other of which may be considered a second side 22, for example the side 22 on the left hand side may be considered on a first side 22 and the side 22 on the right hand side of the drawing may be considered a second side 22. As shown, vertically extending slotted channels 24 are provided in each side 22 as to support shelves, not shown, which extend horizontally between the two sides 22. Each cabinet has an open front 25. As seen in a front view in FIG. 1, the upper cabinet 14 has its open front 25 directed towards the viewer and the lower cabinet 12 has its back 21 directed towards the viewer. As seen in the exploded rear view of FIG. 5, the lower cabinet 12 has its open front 25 directed towards the viewer and the upper cabinet 14 has its back 21 directed towards the viewer. This is a preferred configuration, however, it is within the invention that each of the lower cabinet 12 and upper cabinet 14 are disposed with their fronts 25 both directed in the same direction or other different directions rather than in opposite directions as illustrated in FIG. 1. One cabinet would open to a side and another to a front. While the preferred embodiments illustrate the cabinets 12 and 14 as being cabinets to carry shelving, it is to be appreciated that the cabinets may have different configurations or purposes. For example, the lower cabinet 12 may preferably comprise a filing cabinet with one or more drawers which slide forwardly relative to the cabinet. The upper cabinet 14 may also comprise a filing cabinet, however, may preferably comprise a shelving unit. The upper cabinet 14 may have hinged doors to close its front although this is not necessary.

Figure 18:
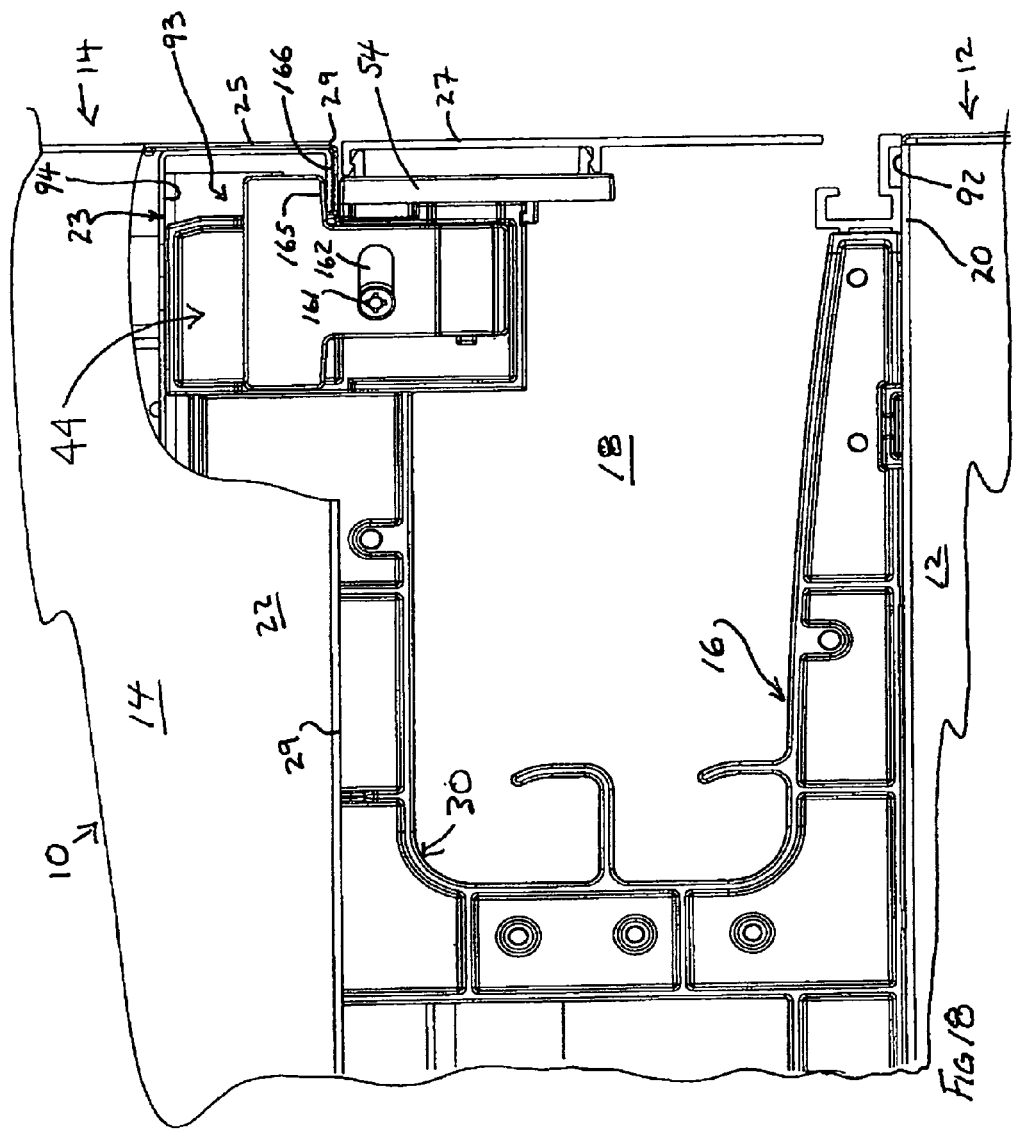
FIG. 18 is a side view of the outer side of the spacer of FIG. 17 installed between upper and lower cabinets with the upper cabinet partially cut away and showing the mounting of a cover plate.

As seen in FIG. 18, the bottom 23 of the upper cabinet 14 is disposed at a height above lower edges 29 of the cabinet's two sides 22, back 21 and front 25 which lower edges lie in a common plane such that a downwardly directed cavity 93 is defined by the under surface 94 of the bottom 23 and inside surfaces of the two sides 22, the back 21 and the front 25 below the bottom 23. Lower portions of the spacer member 16 sit on and are secured to the upper surface 92 of the top 20 of the lower cabinet 12 with upper portions of the spacer 16 received within the cavity 93 engaging the lower surface 94 of the bottom 23.

As seen in FIG. 18, the spacing compartment 18 is defined as the space between the upper surface 92 of the top 20 of the lower cabinet 12 and the lower surface 94 of the bottom 23 of the upper cabinet 14. The compartment 18 has access openings, namely a front access opening, a rear access opening and two side access openings on each of the front, back and two sides, respectively, which in the embodiment illustrated in FIGS. 1 to 5 are closed by cover panels indicated as a front cover panel 26, a back cover panel 27 and two side cover panels 28, each of which is preferably removable.

Referring to FIG. 5, the spacer member 16 comprises two truss members 30, two lower beam members 32 and two upper beam members 34. Each truss member 30 is disposed in a vertical plane extending front to rear and between the top 20 of the lower cabinet 12 and the bottom 23 of the upper cabinet 14. Each of the beam members 32 and 34 span horizontally between the truss members 30 and are spaced from adjacent beam members. Each of the beam members 32 and 34 are fixedly connected at their ends to the truss members 30 to form the spacer member 16 as a rigid assembly.

While the preferred embodiment illustrates the spacer member 16 as having merely two truss members 30 and four beam members 32 and 34, additional truss members may be provided intermediate the two truss members 30 and additional beams may be provided. In addition, cross bracing members may be provided such as beams which may, for example, extend diagonally either in a vertical plane as, for example, between central web portions 42 of the truss members 30 or in a horizontal plane as between the ends of the beams to increase rigidity without detracting from the open architecture structure of the spacer member 16 which permits for easy passage of utility wiring through the compartment 18.

The spacer member 16 preferably is secured to each of the lower cabinet 12 and the upper cabinet 14. As seen in FIG. 6, each truss member 30 carries on a lower flange portion outwardly extending feet 36 via which threaded fasteners such as screws or bolts, not shown, may be used to secure each truss 30 to the top 20 of the lower cabinet 12. Preferably, the spacer member 16 is preassembled and then secured to the top 20 of the lower cabinet 12. Subsequently, the upper cabinet 14 may be placed on top of the spacer member 16 and secured to the spacer member. The upper cabinet could be secured to the spacer member 16 by driving threaded fasteners (not shown) down through the bottom 23 of the upper cabinet 14 into the trusses 30.

Figure 16:
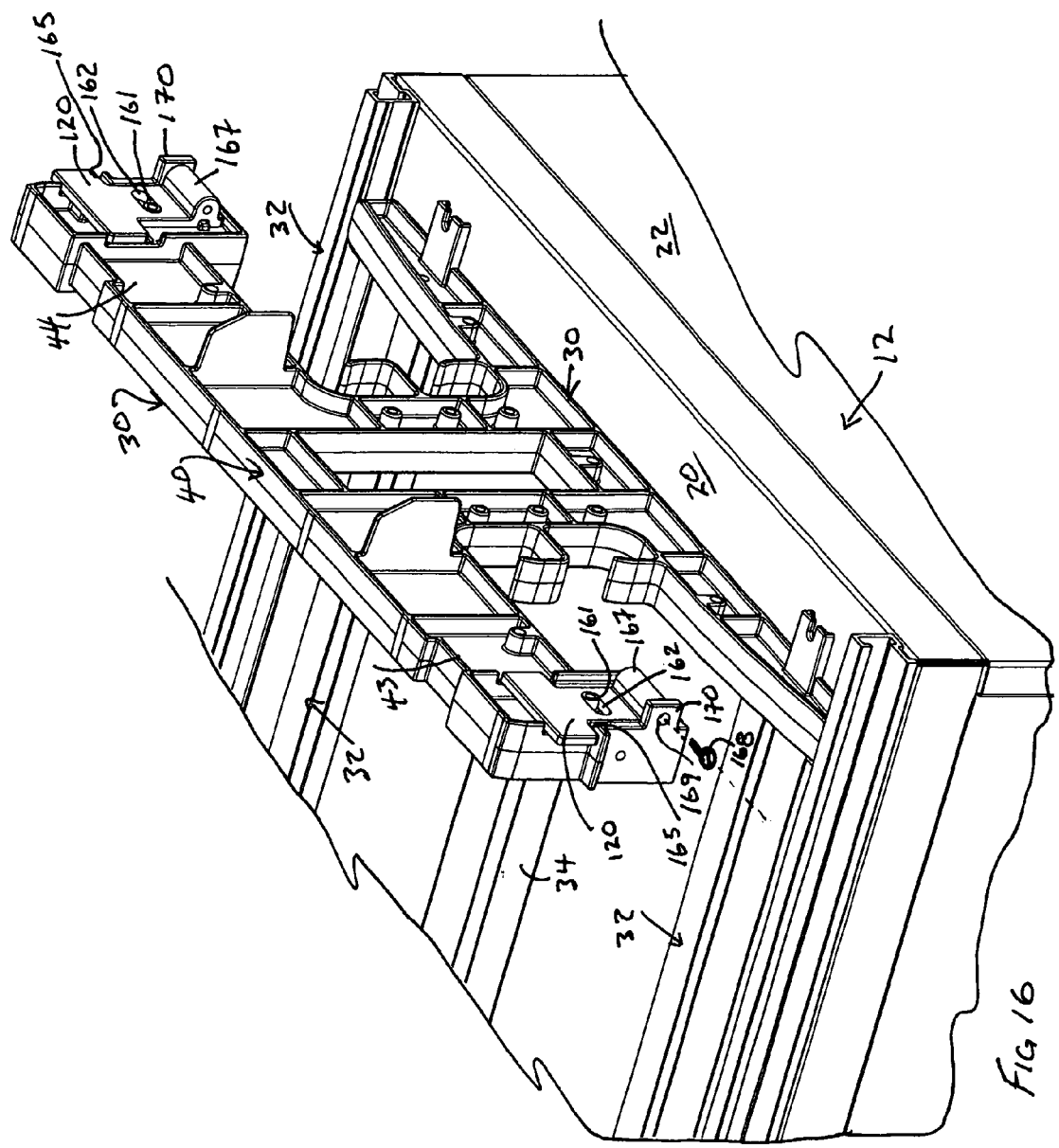
FIG. 16 is a partial perspective view of the spacer of FIG. 13 secured to the lower cabinet and showing the upper and lower beams and mounting plates for front and rear covers.

A preferred method for securing the spacer member 16 to an upper cabinet 14 is shown in FIGS. 13 to 18. As seen in FIG. 16, a slide plate 120 is slidably received on the outer side of each end of the upper flange portion 40 of the truss member 30, with a post 161 extending through a horizontal slotway 162 in the slide plate 120 with the post 161 engaging the ends of the slotway 162 to limit forward and rearward sliding. The slide plate 120 has a T-shape as seen in FIG. 18 with a downwardly directed shoulder 165. The slide plate 120 may be moved forwardly to a forward position shown in FIG. 18 in which the downwardly directed shoulder 165 overlies a return flange 166 of the front or rear of the upper cabinet 14.

The slide plate 120 carries a horizontal threaded bore 167 with a positioning screw 168 as shown in FIG. 16 to extend through an opening 169 in a tab 170 on each end of the upper portion 40 of the truss member 30. The positioning screw 168 is accessible through an opening 124 in a mounting plate 54 to move the slide plate 120 forwardly or rearwardly.

The upper beam members 34 have a U-shaped cross-sectional shape as seen in FIG. 15 and may be adapted to be secured in complementary sized blind bores 111 in the inner side of each truss 30. The upper beam 34 may have other cross-sectional shapes including that of a rectangular tube. Each of the lower beam members 32 is an extrusion having a cross-sectional profile as best seen in FIG. 15 and carries two elongate slotways 37. As seen in FIG. 6, each lower beam 32 has a stepped end. Each lower beam 32 has an outermost portion 38 that extends to the sides 22 outwardly past the truss members 30. An inner portion 39 of the lower beam 32 carrying the channels 37 has an end disposed laterally inside the truss members 30 abutting an inner side surface of each truss member 30 such that threaded fasteners, not shown, may be extended horizontally inwardly through each truss member 30 and into a respective channel 37 to secure the beams 32 to the trusses 30.

Figure 10:
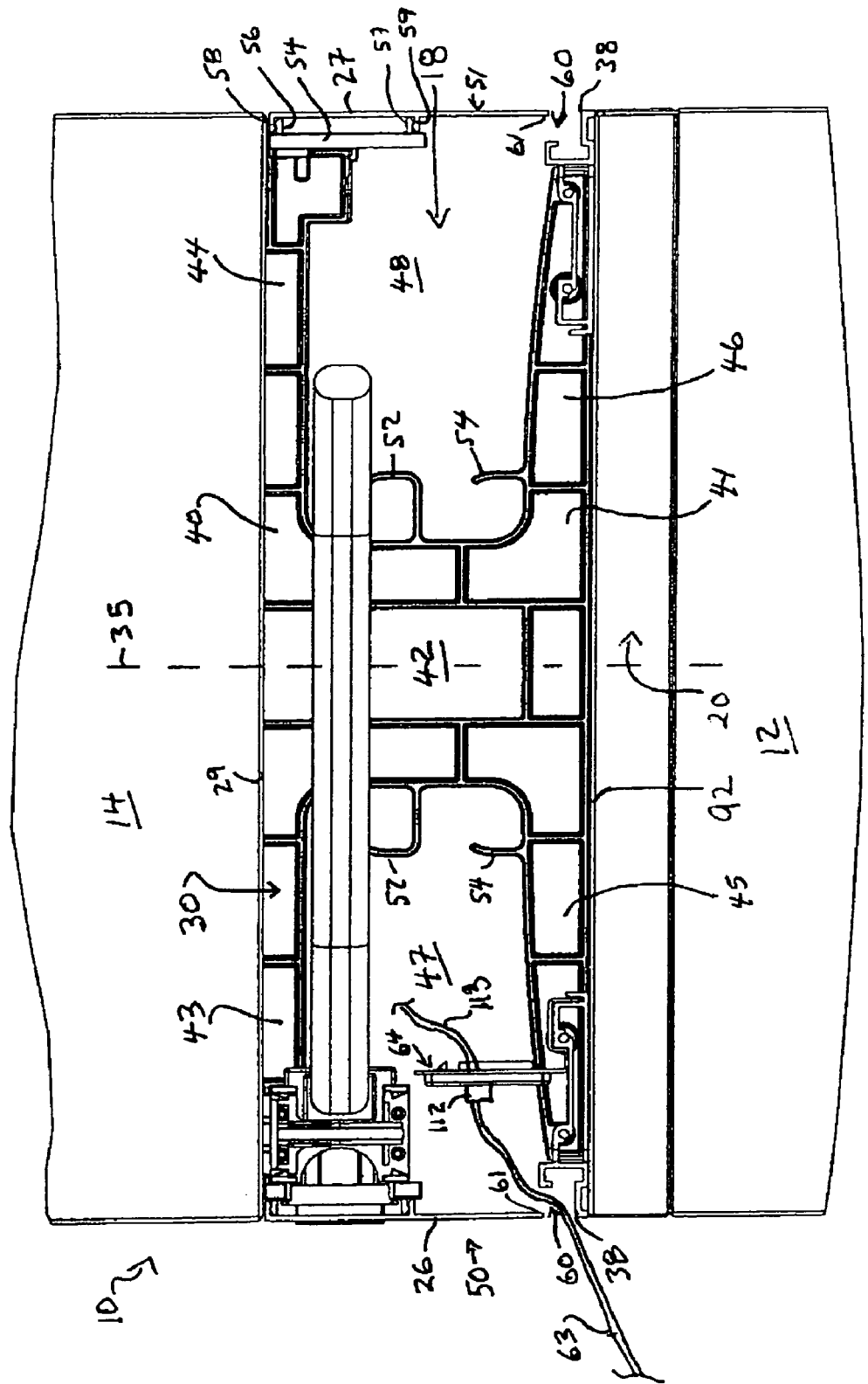
FIG. 10 is a side view of the right hand side of FIG. 6 also showing the upper cabinet and the front cover.
Figure 11:
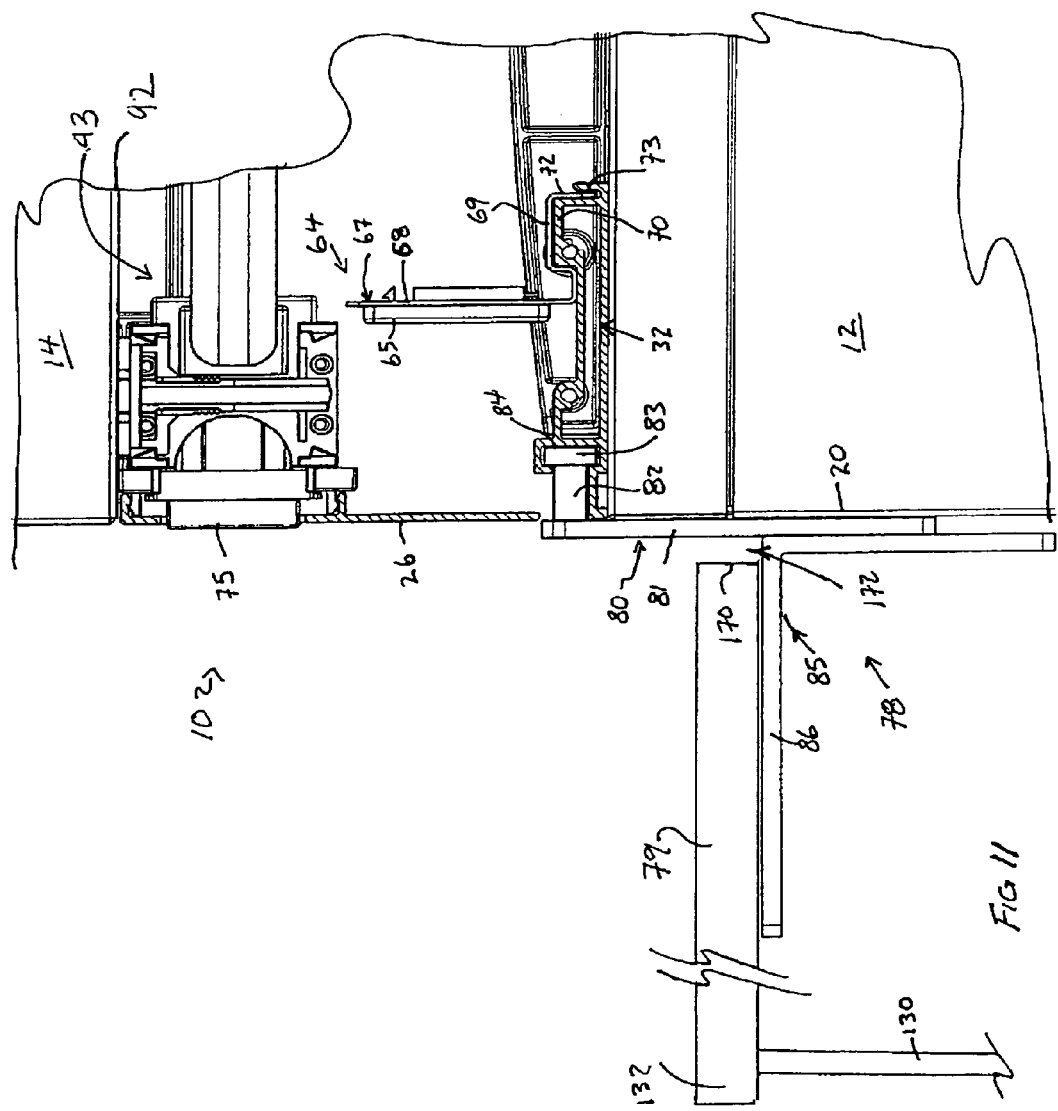
FIG. 11 is an enlarged view of the right hand side of FIG. 10 additionally showing a table support bracket structure.

Each truss member 30 is preferably identical and symmetrical on either side of a central center line 35 shown in FIG. 10. As seen in side view in FIG. 10, the truss member 30 has the appearance of an I-beam like member having an upper flange portion 40 and a lower flange portion 41 separated by the central vertically extending web portion 42. The upper flange portion 40 comprises a forwardly extending front upper arm 43 and a rearwardly extending rear upper arm 44. The lower flange 41 comprises a forwardly extending front lower arm 45 and a rearwardly extending rear lower arm 46. The forwardly extending front upper aim 43 has a distal forward end 143 and a rear end 243 with the rear end 243 fixedly secured to an upper forward portion of the web portion 42. The forwardly extending front lower arm 45 has a distal forward end 145 and a rear end 245 with the rear end 245 fixedly secured to a lower forward portion of the web portion 42. The rearwardly extending rear lower arm 46 has a distal rear end 146 and a forward end 246 with the forward end 246 fixedly secured to a lower rear portion of the web portion 42. The rearwardly extending rear upper arm 44 has a distal rear end 144 and a rear forward end 244 with the forward end 244 fixedly secured to an upper rear portion of the web portion 42. As seen in FIG. 10, the front lower arm 45 and the rear lower arm 46 each engage the upper surface 92 of the top 20 of the lower cabinet 12. Similarly as may be seen in FIGS. 11 and 18, the front upper arm 43 and the rear upper aim 44 each engage the lower surface 94 of a bottom 23 of the upper cabinet 14. As can be seen in FIG. 10, the front lower arm 45 engages the upper surface 92 of the top 20 of the lower cabinet 12 approximate the front of the lower cabinet and the rear lower arm 46 engages the upper surface 92 of the top 20 of the lower cabinet 12 approximate the rear of the lower cabinet 12. As seen in FIG. 11, a forwardly extending front upper arm 43 engages the lower surface 94 of the bottom 23 of the upper cabinet 14 proximate the front of the upper cabinet. As seen in FIG. 18 the rearwardly extending rear upper arm 44 engages the lower surface 94 of the bottom 23 of the upper cabinet 14 approximate the rear of the upper cabinet 14. A front raceway 47 is defined outwardly of the central web portion 42 in the open front side of the I-beam like truss member 30 between the front upper arm 43 and the front lower arm 45. Uninterrupted access is provided to the front raceway 47 inwardly from the front access opening 50 throughout the entire width of the stacked cabinet 10 between the two sides 22. Similarly, a rear raceway 48 is formed in the rear open side of the I-beam like truss member 30 facing a rear access opening 51 inwardly from the rear access opening to the rear of the central web portion 42 and between the rear upper arm 44 and the rear lower arm 46. Uninterrupted access is provided to the rear raceway 48 inwardly from the rear access opening 51 throughout the entire width of the stacked cabinet 10 between the sides 22. With the side covers 28 removed, each of the front raceway 47 and the rear raceway 48 is open to the lateral sides 22 of each cabinet such that as seen, for example, in FIG. 12 when two identical stacked cabinets 10 are placed beside each other with their side cover panels removed, the front raceways 47 of the two stacked cabinets 10 are in continuous communication and provide for laying in of wiring by access merely from the front of the stacked cabinets 10 through the front access openings 50.

As seen in FIG. 10, the spacer member 16 carries on its central web 42 two upper hook members 52 and two lower hook members 53. Each upper hook member 52 is L-shaped and provides with the web portion 42 an upwardly opening opening into which wiring may be laid and retained. Similarly, each lower hook member 54 with an upper surface of the lower flange portion 41 and a surface of the web portion 42 provides an upwardly opening opening to receive and assist in retaining wires which may extend side to side through the front or rear raceways 47 and 48.

Figure 17:
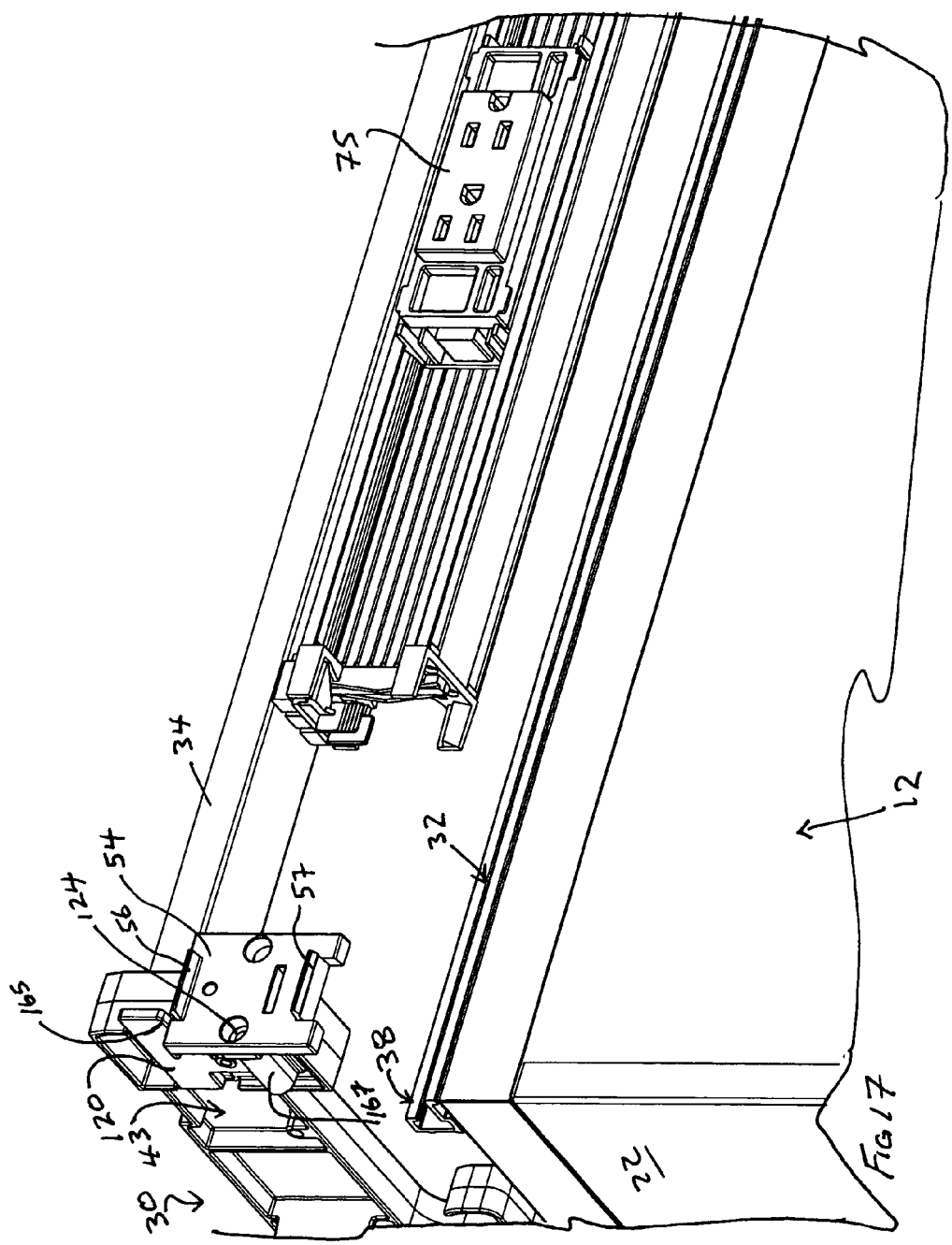
FIG. 17 is a partial perspective view of the spacer of FIG. 16 secured to the lower cabinet and showing a snap plate for the front cover and an electrical wiring connector.

As seen in FIG. 10, each of the front cover panel 26 and the rear cover panel 27 are mounted to the spacer member 16 to provide access to the respective front and rear raceways. In the preferred embodiment shown, the front cover panel 26 and rear cover panel 27 are each removably secured in a snap-fit relation. Each of the truss members 30 have at their front and rear ends a snap plate 54 secured thereto. In this regard, reference is made to FIGS. 13 to 18 showing a truss 30 forming a spacer 16 similar to that in FIGS. 1 to 12 and useful as a substitute. FIG. 16 shows two mounting plates 120 each engaged on the outer side proximate the ends of the front upper arm 43 and the rear upper arm 44. FIG. 17 shows the snap plate 54 secured to the front of the front upper arm 43 via a fastener 124 which extends through the snap plate 54 and into the mounting plate 120. FIG. 10 at its rear shows the snap plate 54 carrying a pair of outwardly extending resilient arms 56 and 57 adapted to be received vertically between a pair of inwardly extending arms 58 and 59 on the inner side of each of the front cover panel 26 or the rear cover panel 27. Thus, each of the front cover panel 26 and the rear cover panel 27 may be coupled to and uncoupled from the spacer member 16 extending horizontally between the upper arms of the truss member 30. Each of the front cover panel 26 and the rear cover panel 27 is shown in FIG. 10 to substantially close the front and rear access openings 50 and 51 extending from proximate the lower edge 29 of the upper cabinet 14 downwardly towards the lower cabinet 12, however, leaving a vertical space 60 between a lower end 61 of the respective front or rear cover panel and the outermost portion 38 of the lower beam 32 carried on the top 20 of the lower cabinet 12. This space 60 is provided such that wiring such as communication wires 63 for computers, telephones and the like may pass outwardly from the compartment 18 to the outside of the stacked cabinet 10 as seen in FIG. 10.

A communications connector 64 is provided inside the compartment 18 as seen in FIGS. 7, 8, 10, 11 and 12. The communication connector 64 comprises a plastic communications outlet 65 carrying three ports 66 into which jacks 112, shown in FIG. 10, for telephones, computers and the like may be inserted in snap fit as is known. The outlet 65 is snap fit received inside a mounting bracket 67 preferably formed from a sheet of sheet metal to have an upstanding plate 68 with a rectangular opening therethrough. The ports 66 are directed outwardly but are open on the inner side of the plate 68 to receive communication wiring schematically shown in FIG. 10 as 113. The bracket 67 is bent so as, as best seen in FIG. 11, to extend rearwardly from the plate 68 and present a downwardly opening U-shaped channel portion 69 to be received in a relative friction fit about a correspondingly U-shaped upwardly extending horizontal rail 70 on the lower bracket 32. The bracket 67 has a downwardly extending distal arm 72 to be received in a friction fit in an upward directed U-shaped slot 73 carried on the lower bracket 32 rearward of the rail 70. The communications connector 64 is adapted to be slid longitudinally along the rail 70 and secured at any positions along the rail as may be desired. Similar communication connectors may also be provided to engage the rear lower bracket 32.

Two electrical outlets 75 are shown in FIG. 6 as secured to the spacer member 16 inside the compartment 18 in the forward raceway 47 with the electrical outlets 75 to be disposed to face outwardly through the forward access opening 50 and through apertures 76 in the front cover panel 26 shown in FIG. 5. The two electrical outlets 75 are preferably carried as a portion of a modular electrical wiring connector 77 adapted to be secured to the underside of the front upper beam 34 and with electrical wiring 74 for providing power to the same to pass through the compartment 18 for connection with a source of electrical power. Such modular connectors 77 providing the electrical outlets are modular units which are commercially available. They may be coupled to the upper beam 34 at desired locations and the outlets 75 may be moved to different longitudinal locations as may be desired.

In the preferred embodiment, the outlets 75 are provided merely for access through the front cover panel 26, however, it is to be appreciated these outlets 75 are not necessary and, as well, that similar outlets may be provided through the rear cover panel 27.

Reference is made to FIG. 11 which illustrates a support bracket assembly 78 as for use, for example, to support a tabletop 79 in front of the stacked cabinet 10 to extend forwardly thereof. The tabletop 79 may be supported in a cantilevered manner merely by the support bracket assembly 78 shown, however, a front support leg 130 may be provided which extends downwardly from the tabletop underneath a distal edge 132 of the tabletop to engage the floor. The support bracket assembly 78 includes a rear bracket member 80 having a vertical post 81 from which a horizontal pin 82 extends rearwardly to an enlarged rearward head 83. The enlarged head 83 is sized to be received within a horizontally extending C-shaped channel 84 in the outer portion 38 of the lower beam 32 against movement rearward or forwardly and with the pin 82 to rest on an upper surface of the outer portion 38. The pin 82 and its enlarged head 83 may be inserted into the channel 84 at each side of a stacked cabinet 10 and slid longitudinally to its desired location. The vertical post 81 extends vertically downwardly from the pin 82 in front of the back 20 of the lower cabinet 12. The vertical post 81 carries an L-shaped bracket 85 which is adapted to be secured to the post 81 at different height locations as indicated by the arrow. The tabletop 79 may be placed such that its under surface is supported by the upper surface of a horizontally extending leg 86 of the L-shaped bracket 85 with the tabletop to extend horizontally and forwardly from the lower cabinet 12 presenting a work surface. Preferably, the rear edge 170 of the tabletop is spaced forwardly from the cabinets to provide a vertical gap 172 via which utility wiring may pass to below the workspace. Utility wiring is provided to the top of the work surface of the tabletop 79 and to the gap 172 as from the electrical outlets 75 and from the communication wiring which may pass outwardly from the communications outlet 65. While the support bracket assembly 78 is height adjustable by reason of providing two brackets 80 and 85, it is not necessary that the height be adjustable in assembly one bracket is required.

Figure 12:
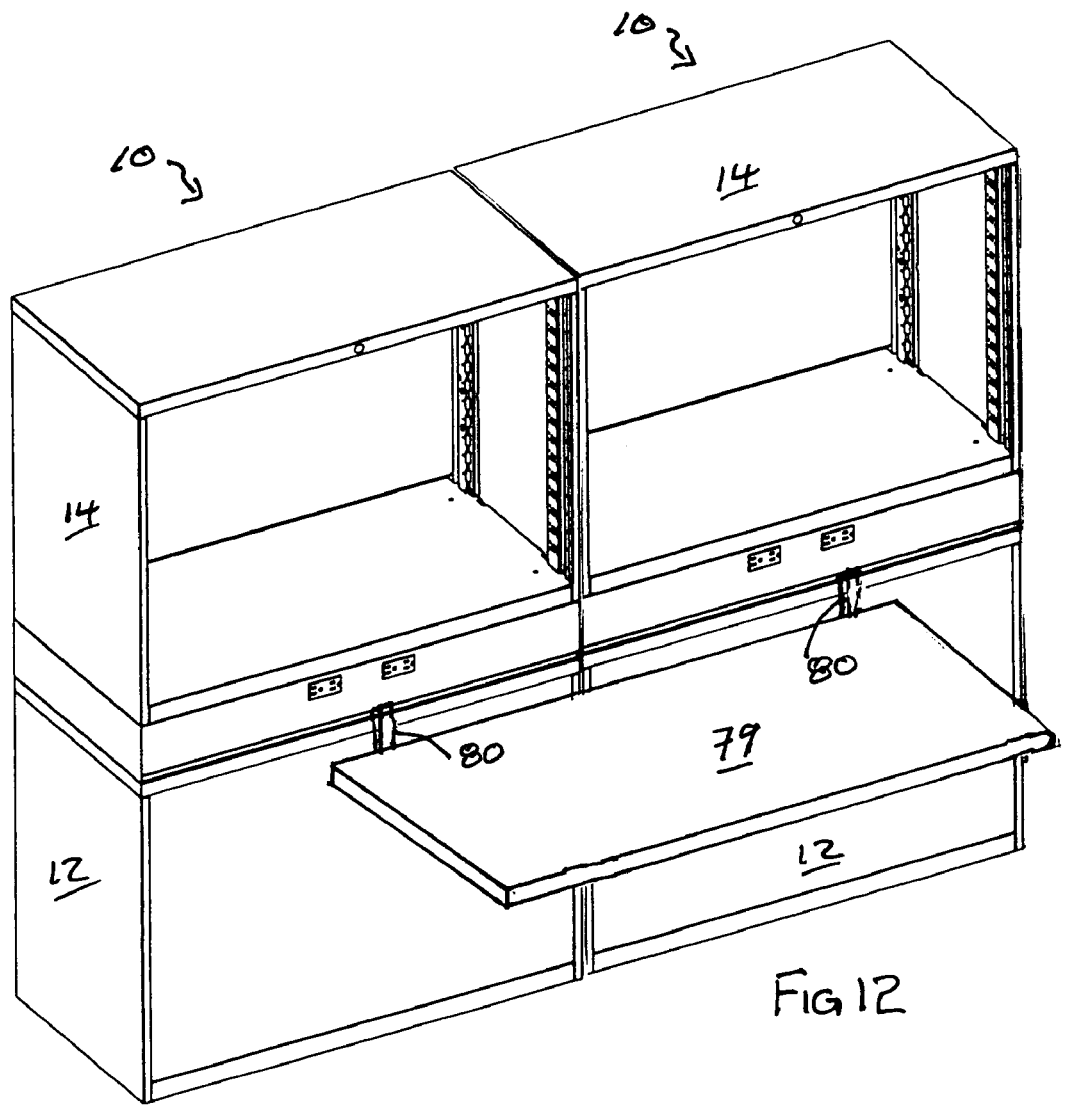
FIG. 12 is a schematic perspective view showing two stacked cabinets side-by-side.

As seen in FIG. 12, each stacked cabinet 10 may be provided as a modular unit and used with other stacked cabinets so as to provide for utility wiring to pass through each stacked cabinet 10 into adjacent stacked cabinets. In FIG. 12 two identical stacked cabinets 10 are side-by-side. One of the stacked cabinets may be considered a first stacked cabinet structure and the other may be considered a second stacked cabinet structure. For example the left hand most cabinet structure 10 may be considered a first stacked cabinet structure and the right hand most cabinet 10 may be considered a second stacked cabinet structure. A tabletop 79 is shown secured to the stacked cabinets 10 providing a desk surface preferably substantially supported by connection with the support bracket assembly 78 described. In FIG. 12, two identical stacked cabinets 10 are side-by-side with the side covers (not shown) on their common sides removed such that their two internal compartments 18 are in open communication. The spacer member 16 provides a mechanism for connection of pre-existing cabinets 12 and 14 without the need for substantial modification of the cabinets. Preferably, the spacer member 16 provides a mechanism to which removable access covers, electrical outlets, communication ports and mounting brackets for other devices such as table surface support brackets and partitions may be coupled without the need to provide modification of the upper or lower cabinets 12 or 14.

Preferably, the spacer member 16 may be preassembled as a rigid unit and, preferably, pre-wired at least with a modular electrical connector 77. Alternatively, the spacer member may be provided preassembled and, after the spacer member 16 may be coupled to the lower cabinet, suitable application of electrical wiring, electrical outlets, communications wiring and communication ports may be applied. Subsequently, the upper cabinet may be applied. Of course, with the compartment 18 being substantially open to permit passage of utility wiring therethrough the entirety of its space and, for example, front to back from the front raceway to the rear raceway and sideways as well as vertically throughout the open space of the compartment 18, utility wiring may readily be wired and routed through the stacked compartment 10 and any adjoining similar stacked compartments 10 or other structures having raceways in communication with the front and rear raceways after assembly.

FIG. 12 shows two adjacent stacked cabinets as to permit for laying of wiring, for example, with the front cover panels removed and with wiring which is to pass from beyond the outer sides of each two adjacent stacked cabinets 10 to be moved inwardly through the planes of each of the four sides 22 of the two stacked cabinets into the front raceway 47 and laid in the front raceway 47 as, for example, to be engaged within the confines of the hooks 54 without the need for the wiring to be woven or threaded through any closed aperture. Such laying in of wires is referred to as a "lay-in capability".

Figure 19:
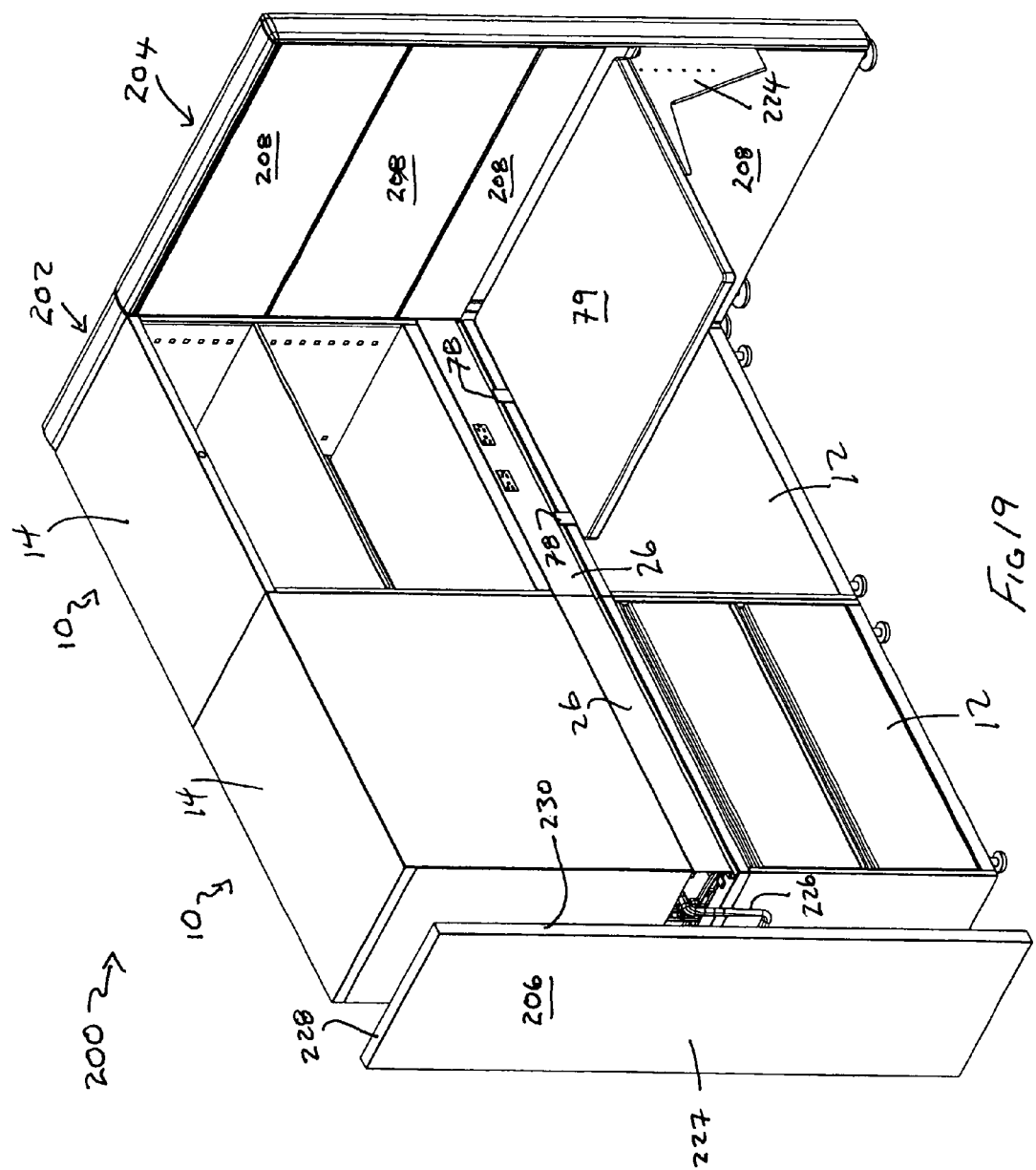
FIG. 19 is a schematic pictorial view showing two stacked cabinets side-by-side in an office environment forming a workstation with wall partitions and a desktop.

Reference is made to FIG. 19 showing two stacked cabinets 10 coupled together side-to-side in an exemplary office environment to form a workstation 200 with two wall partitions 202 and 204, a tabletop 79 and an side cap 206.

Figure 20:
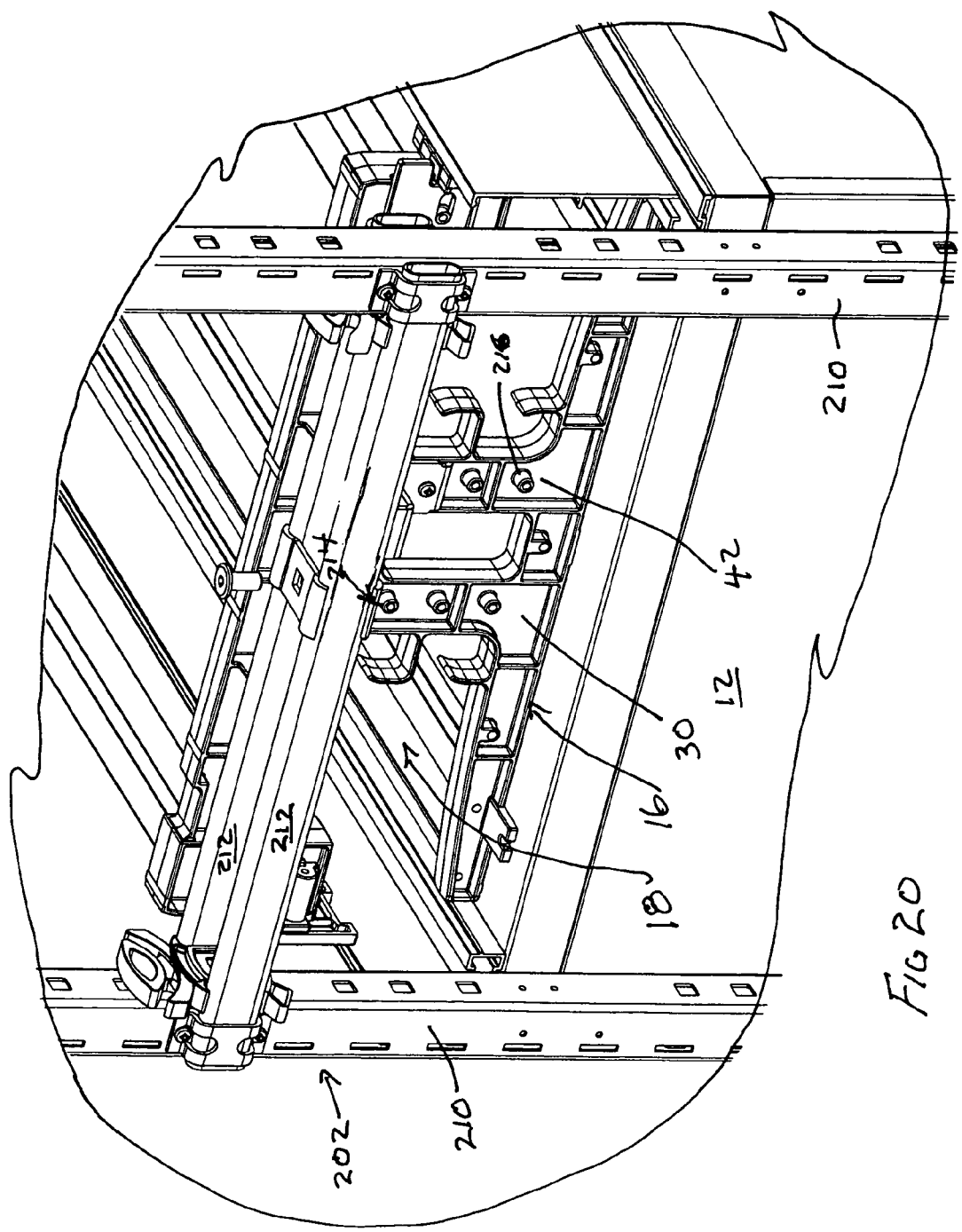
FIG. 20 is a schematic partially cut-away view of the framework for a wall partition for joining to a far end of the cabinets in FIG. 19.
Figure 21:
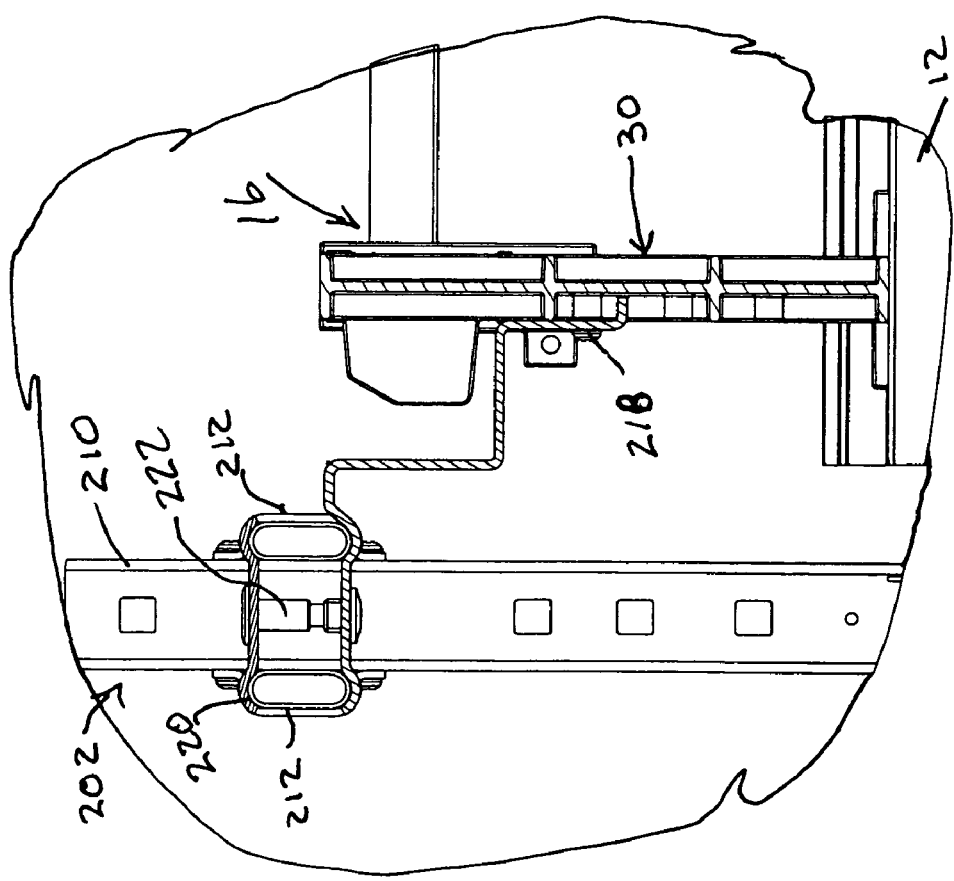
FIG. 21 is a schematic partially cut-away cross-sectional side view showing mechanical coupling of the framework of the wall partition to the cabinets as in FIGS. 19 and 20.

The wall partitions 202 and 204 are of a construction as described in U.S. Pat. No. 5,406,760 to Edwards, the disclosure of which is incorporated herein with removable covers 208 attached to an internal framework of vertical posts 210 and pairs of horizontal beams 212 as seen in FIGS. 20 and 21. In this regard, FIG. 20 is a partially cut-away rear view of the partition 204 shown in FIG. 19 with its covers 208 removed as looking rearwardly to see the spacer member 16 above the lower cabinet 12. The partition 202 provides an open interior inside the covers 206 providing, in effect, horizontal and vertical raceways throughout the partition 202 open at its top, bottom, front, back and each end. The spacing compartment 18 above the lower cabinet 12 is open to the open interior of the partition 202 through the side access opening on the side of the compartment adjacent the partition 202 for passage therebetween of utility wiring. FIG. 21 is a schematic side cross-sectional view shown in FIG. 20 but showing a connection bracket 214 fixedly secured at a first end to the framework as to beams 212 and fixedly secured at a second end to the spacer member 16 as to the truss member 30. In this regard, the truss member 30 carries on its central web portions 42 a plurality of raised cylindrical bosses 216 each with a central bore to receive a screw 218 which secures the second end of the bracket 214 to the truss member 30. The first end of the bracket 212 underlies both beams 210 and is clamped onto the beams with an upper clamp plate 220 and a clamping bolt and nut arrangement 222.

The two partitions 202 and 204 are fixedly connected end-to-end in a known manner, with internal cavities of each in communication.

The tabletop 79 is secured along one side edge to the back of the lower cabinet 12 by two support bracket assemblies 78 as shown in FIG. 11. The tabletop 79 is also supported via cantilevered brackets 224 to the framework of the partition 204.

The workstation 200 has the stacked cabinet 10 to which the tabletop 79 is secured with its upper cabinet 14 facing towards the tabletop 79 accessible above the tabletop 79 for use by a person at the tabletop 79 and its lower cabinet 12 facing away from the tabletop 79. The other cabinet 10 has its upper cabinet 14 facing away from the person at the tabletop and its lower cabinet 12 facing the person at the tabletop as may be preferred to provide another workstation on the other side of the two stacked cabinets 10.

FIG. 19 shows a side cap 206 adapted to be secured to an outer side of the stacked cabinet 10 and provide a vertical raceway within the interior of the side cap 206 open to the compartment 18 via a side access opening of the compartment 18 for passage of wiring indicated as 226 therebetween. The end cap 206 has a side wall 227 and top and bottom flanges 228 and front and rear flanges 230 extending laterally therefrom towards the stacked cabinet 10 to provide an interior space therein which when the end cap is secured to the stacked cabinet 10 becomes closed by the sides 22 of the cabinets 12 and 14 but is open via the side access opening into the compartment 18. The end cap 206 may have knockout exit openings as in its top flange 224 to permit wiring in its internal space to be connected as to building utilities. The end cap 206 may preferably be fixed to the stacked cabinet by fasteners (not shown) engaging the spacer member 16 as by engaging in the bosses 216 in the truss member 30.

In FIG. 19, utility wiring may be laid in between the two stacked cabinets 10, into the partition 202 and then into the partition 204 as with the front covers 26 of the two cabinets 10 removed and a cover 208 of the partition 204 at the same height as the front cover 206 removed.

While the invention has been described with reference to the preferred embodiments, many modifications and variations will now occur to a person skilled in the art. For a definition of the invention, reference is made to the following claims.

The invention claimed is:
1. A stacked cabinet structure having:
a lower cabinet with a top, a bottom, a front, a back and two sides, namely a first side and a second side,
an upper cabinet with a top, a bottom, a front, a back and two sides, namely a first side and a second side, and
a spacer member intermediate the top of the lower cabinet and the bottom of the upper cabinet,
the upper cabinet stacked vertically above the bottom cabinet with the two sides of the upper cabinet in vertical alignment with the respective two sides of the lower cabinet, the front of the upper cabinet in vertical alignment with one of the front and back of the lower cabinet, and the back of the upper cabinet in vertical alignment with the other of the front and back of the lower cabinet,
the spacer member supported by the top of the lower cabinet and supporting the bottom of the upper cabinet spaced vertically from the top of the lower cabinet forming a spacing compartment between the top of the lower cabinet and the bottom of the upper cabinet for passage of utility wiring,
the compartment open at a front access opening,
the spacer member comprising at least two truss members spaced sideways from each other and a plurality of horizontally extending beam members,
each truss member disposed in a vertical plane extending front to rear and between the top of the lower cabinet and the bottom of the upper cabinet,
each beam member spanning horizontally between the truss members spaced from adjacent beam members,
each beam member fixedly connected to the truss members to form the spacer member as a rigid assembly,
each truss member has a forwardly extending upper arm and a forwardly extending lower arm with an uninterrupted forward vertical space therebetween open forwardly to the front access opening and extending inwardly from the front access opening, a front raceway inwardly of the front access opening extending uninterrupted from one side of the compartment to the other side and through the forward vertical space of each truss member with uninterrupted access to the front raceway inwardly from the front access opening throughout the entirety of the width of the compartment from one side of the compartment to the other side of the compartment, the compartment open at a rear access opening, each truss member has a rearwardly extending upper arm and a rearwardly extending lower arm with an uninterrupted rear vertical space therebetween open to the rear access opening and extending inwardly from the rear access opening, a rear raceway inwardly of the rear access opening extending uninterrupted from one side of the compartment to the other side and through the rear vertical space of each truss member with uninterrupted access to the rear raceway inwardly from the rear access opening throughout the entirety of the width of the compartment from one side of the compartment to the other side of the compartment.

2. The stacked cabinet structure as claimed in claim 1 wherein the front raceway is open through at least one side of the compartment for passage of utility wiring into or out of the compartment.

3. The stacked cabinet structure as claimed in claim 1 wherein the compartment is open at a side access opening at each side of the compartment with each side access opening opening forwardly into the front access opening, the front raceway is open through both sides of the compartment via the side access opening for passage of utility wiring into or out of the compartment and to permit laying in of utility wiring across the entire width of the stacked cabinet structure from a position forward of the front access opening rearwardly to a position in the front raceway.

4. The stacked cabinet structure as claimed in claim 3 in combination with a second structure with a top, a bottom, a front, a back and two sides, namely a first side and a second side, the second structure having an access opening through its front and a horizontal front raceway with uninterrupted access provided to the raceway of the second structure inwardly through the front access opening of the second structure throughout the entire width of the second structure from the first side to the second side of the second structure with the raceway of the second structure open through the first side for passage of utility wiring through the first side of the second structure, the second structure disposed with its first side adjacent the second side of the lower cabinet and with the raceway of the second structure opening through the first side of the second structure and through the second side of the lower cabinet into the front raceway of the stacked cabinet structure to permit laying in of utility wire across the entire combined width of the stacked cabinet structure and the second structure.

5. The stacked cabinet structure as claimed in claim 3 in combination with a second cabinet structure substantially identical to the stacked cabinet structure, the stacked cabinet structure and the second cabinet structure disposed with a second side of the stacked cabinet structure adjacent a first side of the second cabinet structure and with the front raceway of the stacked cabinet structure opening into a front raceway of the second cabinet structure to permit laying in of utility wire across an entire combined width of the stacked cabinet structure and the second cabinet structure from a position forward of the front access opening of the stacked cabinet structure and a front access opening of the second cabinet structure rearwardly to a position in the front raceway of the stacked cabinet structure and the front raceway of the second cabinet structure.

6. The stacked cabinet structure as claimed in claim 1 wherein the front raceway is open at least one side of the compartment for passage of utility wiring into or out of the compartment, and the rear raceway is open at least one side of the compartment for passage of utility wiring into or out of the compartment.

7. The stacked cabinet structure as claimed in claim 1 wherein the compartment is open at a side access opening at each side of the compartment with each side access opening opening forwardly into the front access opening and rearwardly into the rear access opening, the front raceway is open through both sides of the compartment via the side access opening for passage of utility wiring into or out of the compartment and to permit laying in of utility wire across the entire width of the stacked cabinet structure from a position forward of the front access opening rearwardly to a position in the front raceway, the rear raceway is open through both sides of the compartment via the side access opening for passage of utility wiring into or out of the compartment and to permit laying in of utility wire across the entire width of the stacked cabinet structure from a position rearward of the front access opening forwardly to a position in the rear raceway.

8. The stacked cabinet structure as claimed in claim 1 wherein each truss member has a central vertically extending web portion which supports each of the forwardly extending upper arm, the forwardly extending lower arm, the rearwardly extending upper arm, and the rearwardly extending lower arm.

9. The stacked cabinet structure as claimed in claim 8 wherein the forwardly extending upper arm has a distal forward end and a rear end with the rear end fixedly secured to an upper forward portion of the web portion, the forwardly extending lower arm has a distal forward end and a rear end with the rear end fixedly secured to a lower forward portion of the web portion, the rearwardly extending upper arm has a distal rear end and a forward end with the forward end fixedly secured to an upper rear portion of the web portion, the rearwardly extending lower arm has a distal rear end and a forward end with the forward end fixedly secured to a lower rear portion of the web portion.

10. The stacked cabinet structure as claimed in claim 9 wherein one truss member is proximate the first side of the lower cabinet and the other truss member proximate the second side of the lower cabinet member.

11. The stacked cabinet structure as claimed in claim 9 including a front cover panel coupled to the spacer member which at least partially closes the front access opening and movable to provide access to the compartment through the front access opening.

12. The stacked cabinet structure as claimed in claim 1 wherein each truss member has a vertically extending web portion which support each of the forwardly extending upper arm, and the forwardly extending lower arm, the forwardly extending upper arm has a distal forward end and a rear end with the rear end fixedly secured to an upper forward portion of the web portion, and the forwardly extending lower arm has a distal forward end and a rear end with the rear end fixedly secured to a lower forward portion of the web portion.

13. The stacked cabinet structure as claimed in claim 12 wherein one truss member is proximate the first side of the lower cabinet and the other truss member proximate the second side of the lower cabinet member.

14. The stacked cabinet structure as claimed in claim 1 including a front cover panel coupled to the spacer member which at least partially closes the front access opening and movable to provide access to the compartment through the front access opening.

15. The stacked cabinet structure as claimed in claim 1 including a front cover panel coupled to the spacer member which at least partially closes the front access opening and movable to provide access to the compartment through the front access opening and a rear cover panel coupled to the spacer member which at least partially closes the rear access opening and movable to provide access to the compartment through the rear access opening.

16. The stacked cabinet structure as claimed in claim 13 wherein each of the lower cabinet and the upper cabinet consist of a filing cabinet.

17. The stacked cabinet structure as claimed in claim 1 wherein each of the lower cabinet and the upper cabinet consist of a filing cabinet.

18. The stacked cabinet structure as claimed in claim 9 wherein the forwardly extending upper arm engages the bottom of the upper cabinet proximate the front of the upper cabinet, the rearwardly extending upper arm engages the bottom of the upper cabinet proximate the front of the upper cabinet, the forwardly extending lower arm engages the top of the lower cabinet proximate the front of the lower cabinet, and the rearwardly extending lower arm engages the top of the lower cabinet proximate the rear of the lower cabinet.

19. The stacked cabinet structure as claimed in claim 12 wherein the front raceway and the rear raceway are in communication with each other internally through the compartment between the truss members.

20. The stacked cabinet structure as claimed in claim 1 including an electrical outlet mounted to the spacer member in the front raceway coupled to electrical wires.

21. The stacked cabinet structure as claimed in claim 3 including an electrical outlet mounted to the spacer member in the front raceway, a front cover panel coupled to the spacer member which closes the front access opening and is movable to provide access to the compartment through the front access opening, the front cover panel has an aperture therethrough providing access to the outlet when the front cover panel substantially closes the front access opening.

22. The stacked cabinet structure as claimed in claim 3 including a communication connection port mounted to the spacer member in the front raceway.

23. The stacked cabinet structure as claimed in claim 9 wherein apertures are provided through the web portion for passage of utility wiring therethrough.

* * * * *